Patented Apr. 29, 1930

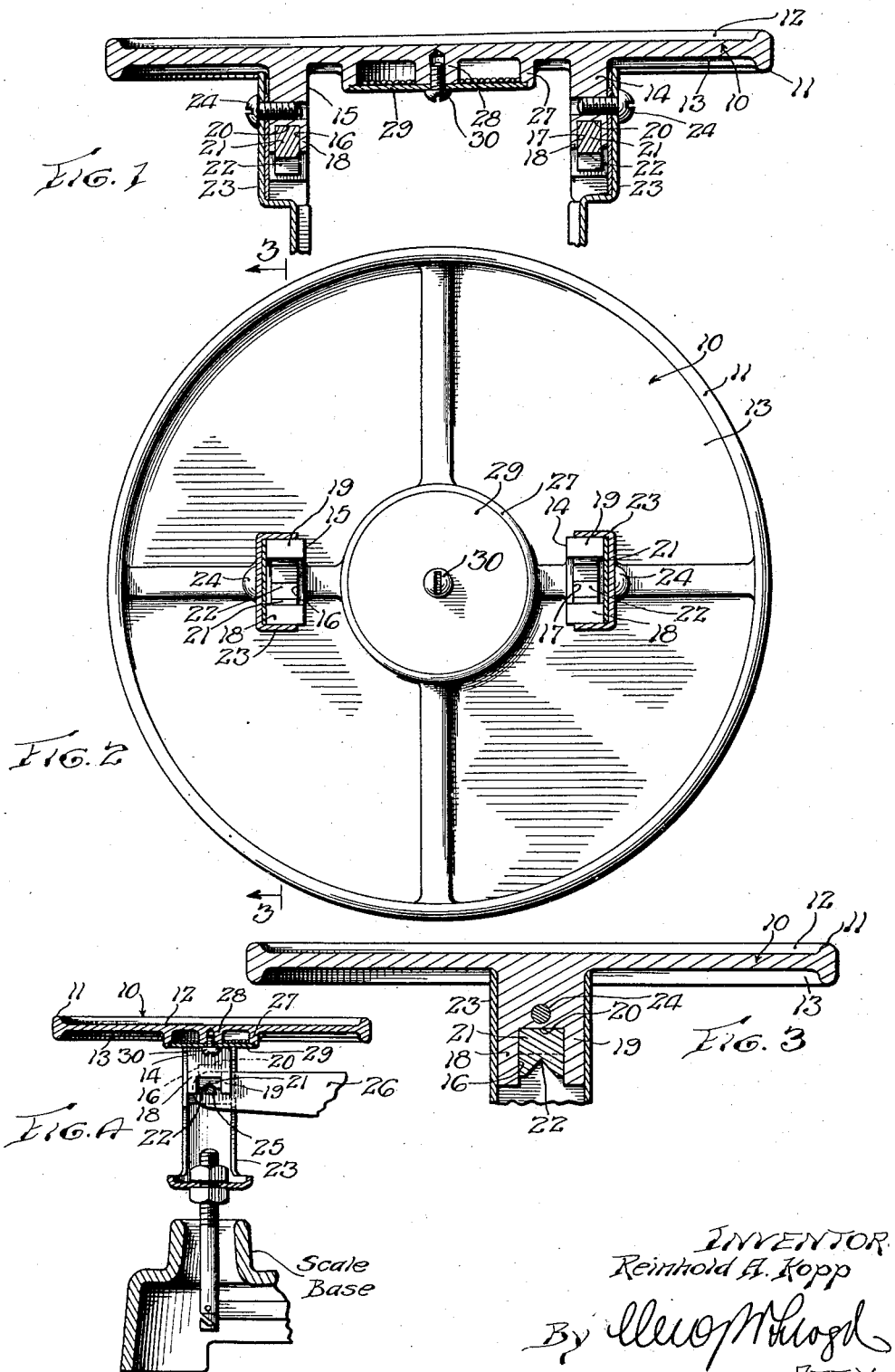

1,756,292

UNITED STATES PATENT OFFICE

REINHOLD A. KOPP, OF CHICAGO, ILLINOIS, ASSIGNOR TO W. M. WELCH MFG. CO., OF CHICAGO, ILLINOIS, A CORPORATION OF ILLINOIS

SCALE PAN

Application filed April 8, 1929. Serial No. 353,298.

The present invention has to do with scales, and has particularly to do with a scale pan or top. This top or pan may be used with a beam scale, or with any other type of scale to which it may be attached.

One of the objects of the present invention is to provide a bakelite, molded disc to replace the opalite glass top generally found upon scales, and a further object of the invention is to provide better facilities for securing the agate bearings upon a scale pan.

A third object of the invention is to provide an improved assembly of parts giving a more rigid construction and a greater precision than is obtained in the conventional assembled scale pan.

These objects, and such other objects as may hereinafter appear, are obtained by the novel construction, unique arrangement, and improved combination of the several elements which constitute the single form of the invention herein illustrated, and in which Figure 1 is a diametric section through a scale pan formed in accord with the invention;

Figure 2 is a bottom view thereof;

Figure 3 is a section on the line 3—3 of Figure 2, and

Figure 4 is a fragmentary detail showing the manner in which the pan is assembled upon the end of a scale beam.

Like reference characters are used to designate similar parts in the drawing and in the description of the invention hereinafter given.

In the present form of the invention, the plate is designated by the ordinal 10. This is a molded bakelite disc having a circumferential flange 11 whereby the top is dished as indicated at 12. The underside is also dished as shown at 13.

On the under side of the plate 10 are two ears 14 and 15 which extend downwardly. In the lower end of the ears or lugs 14 and 15 are recesses 16 and 17 so formed that agate bearings can be cemented thereinto. The recesses 16 and 17 have legs 18 and 19 and a base 20 and it is against said base and between said legs that an agate bearing 21 is seated, its bearing surface being of a V-shape, and marked 22.

An U-shaped stamping 23 is provided and this is screwed to the ears 14 and 15 on each side of the bakelite disc. The screws are designated 24. This assembly which causes the U-shaped member to enclose three sides of the lugs 14 and 15 gives a rigid construction and a greater precision because the ears 14 and 15 are molded integrally with the pan and into position with an accuracy equal to the accuracy of the mold in which the bakelite disc and ears are cast.

This positioning and adjustment of the agate bearings 21 is practically independent of the skill of the workman in the shop.

The lugs or ears 14 and 15, such as described and illustrated, being cast on the under side of a moldable substance with which they are integral will carry and accurately locate the position of agate bearing face 22 to receive a knife edge 25 at each end of a beam 26.

Concurrently with the molding of the bakelite pan 10, a circular flange 27 is made in the under side of the bakelite disc and in the center of which is a lug 28. Over the recess formed within the flange 27 may be screwed a metal cap plate 29, a screw 30 being provided for this purpose. The flange 27 forms a receptacle for small shot which are usually used to adjust the two sides of the balance in assembly to absolute equality.

Such adjustment will be accomplished by weighing the disc 10, the U-shaped metal stamping 23, the agate bearings 21, and the metal cap 29 and screw 30, using small shot until a perfect balance is obtained.

Then, by screwing on the metal disc 29, the two pan units, pan and beam, are ready for assembly in a given balance. This feature is new, for in the old design of scales, a metal part, generally a spider, had a depression stamped in the center thereof into which shot was placed, and this shot was retained in position by and when the opal glass disc was put in position on the metal spider.

The use of the several parts herein named is not new in the art but the manner in which they are now made is distinctly new as will now be pointed out. Moulded recesses for agate bearings as an integral part of the plate 10, and moulded as to size, form and position accurately and as a part of the plate, are new, and thereby there is fixed the relationship between the two agates which are attached to each plate for bearing parts upon the knife edges. The weight adjustment cap plate 29, directly attached to the plate 10, makes the unit system of these parts adjustable to a predetermined accurate weight, a wholly novel feature.

I claim:

1. In a scale having a pan supporting standard, an integral structure comprising a pan having legs telescoping into said standard.

2. An integral scale pan structure comprising a dished top object receiving portion, legs depending therefrom, and an inverted receptacle to receive balancing material.

3. A scale pan comprising a molded dished top member having depending legs adapted to be attached to a supporting standard, and a recessed portion intermediate said legs to receive balancing material.

4. A scale comprising a pan supporting standard, and a molded pan upon such standard of integral structure and including a dished top, radial reinforcements and legs engaging said standard depending from said reinforcements.

5. For use in a scale, a pan having a depending support, radial reinforcements and a concentrically arranged recessed shot receiving section integrally formed.

6. An integral scale pan comprising a dished top and legs depending therefrom, said legs being recessed to receive agate bearing blocks.

7. A scale pan of a moulded phenolic condensation product comprising an integral dished object receiving top, and legs depending therefrom, said legs having furcations terminating in a seat adapted to receive an agate block.

REINHOLD A. KOPP.